May 14, 1935. E. P. HALLIBURTON Re. 19,570

METHOD AND APPARATUS FOR CEMENTING WELLS

Original Filed Jan. 22, 1932 3 Sheets-Sheet 1

Inventor

Erle Palmer Halliburton

By Lyon & Lyon

Attorneys

May 14, 1935. E. P. HALLIBURTON Re. 19,570

METHOD AND APPARATUS FOR CEMENTING WELLS

Original Filed Jan. 22, 1932 3 Sheets-Sheet 2

Inventor
Erle Palmer Halliburton
Lyon & Lyon
Attorneys

May 14, 1935. E. P. HALLIBURTON Re. 19,570

METHOD AND APPARATUS FOR CEMENTING WELLS

Original Filed Jan. 22, 1932 3 Sheets-Sheet 3

Inventor
Erle Palmer Halliburton
By Lyon & Lyon
Attorneys

Reissued May 14, 1935 Re. 19,570

UNITED STATES PATENT OFFICE 19,570

METHOD AND APPARATUS FOR CEMENTING WELLS

Erle Palmer Halliburton, Los Angeles, Calif., assignor to Halliburton Oil Well Cementing Company, Duncan, Okla., a corporation of Delaware Original No. 1,860,669, dated May 31, 1932, Serial No. 588,110, January 22, 1932. Application for reissue January 18, 1933, Serial No. 652,387

32 Claims. (Cl. 166—21)

This invention relates to a method of sealing and cementing long strings of casing or pipe within a well hole so as to prevent the migration of subterranean fluids between upper and lower portions of the well hole.

The invention is particularly directed toward a method of cementing deep wells in which a long string of pipe or casing of substantially uniform diameter is positioned in a well hole whereby the entire well hole exteriorly of the pipe or casing or any desired portion thereof, may be filled with a cementitious material in a rapid, economical and positive manner. The invention also relates to apparatus by means of which the method of this invention may be carried out.

The desirability of filling the space existing in a well hole exterior of a pipe or casing with a cementitious material for the purpose of preventing migration of fluids along the length of the pipe or casing and for sealing off strata bearing undesirable fluids such as, for example, salt water when the purpose of the well is to recover hydrocarbons, has been acknowledged by the prior art. As a matter of fact, the exclusion of water from oil bearing formations is a matter of very grave importance.

Heretofore, it has not been possible to cement a long string of pipe or casing within a well hole in one operation, this limitation being partially caused by the relatively high temperatures encountered in deep wells, the presetting of the cementitious material when attempt is made to pump the same downwardly through the pipe or casing and upwardly through the annular space between the casing and the surrounding wall, and the high pressures necessary to raise the cementitious slurry from the bottom of a deep well upwardly through such annular space. As a precaution against the aforementioned conditions, when long strings of casings are to be run in a well and when it is desired to exclude water or other fluid in the hole by the use of cementitious material, it has been necessary to resort to very expensive and difficult practices.

For example, when it is desired to exclude water or other fluid from the well hole by the use of cementitious material, it has been the practice to start drilling of the well by using a relatively large bit and to set casing having a diameter of say 10 to 30 inches. After a few hundred feet of this casing has been set, it is cemented in place in the well hole. A smaller bit is then introduced through the center of this casing and several hundred feet or more of smaller casing then set and cemented within the larger casing. This procedure is employed until at a depth of say 8,000 feet, the casing is of a relatively small diameter, as of the order of 3 to 7 inches.

It is evident that this method of drilling and cementing wells is very costly, the cost being high not only because of the larger sizes of casing required, but also because of the larger amount of time required to drill the large diameter holes in the upper portion of the well. Furthermore, the drilling operation is periodically suspended during cementing and much time is lost in waiting for the cement to properly set before continuing the drilling operation to lower depths.

The invention relates to a method whereby a long string of casing or pipe may be quickly cemented along its entire length in a well hole without the necessity of pumping the entire charge of cementing material downwardly through the entire length of the casing or pipe, thereby obviating the necessity of forcing the cementitious material upwardly along the annular space surrounding the pipe or casing from the lowermost portion of the casing to the top of the well. By the method of this invention, all or any portion of a long casing may be readily and quickly cemented in. Moreover, the use of wash pipe through the center of the casing as a conduit for the cementitious material, with the difficulties attending its removal when drilling out the center of the casing, is obviated by this invention. Also, the method of this invention permits substantially all of the cementitious material to be ejected from the casing into direct contact with the walls of the well hole, only a small predetermined quantity of cement remaining in the casing for the purpose of insuring a good neat cement seal in the well hole in the region of the cementing valve.

An object of this invention is to disclose and provide a method of cementing long strings of casing in a well hole without the use of prohibitive pressures during the placing of the cementitious material in its proper place behind the casing in the well hole.

Another object of this invention is to disclose and provide a method of cementing deep wells exposed to high temperatures in the lower portions thereof.

An object of this invention is to disclose and provide a method of filling the annular space surrounding a long string of casing or pipe in a well hole without passing all of the cementitious material around the bottom of the casing or through ports located near the bottom of the casing or pipe.

A further object of this invention is to disclose and provide a method of cementing long strings of casing wherein ports are serially opened along the length of the casing and cementitious material serially ejected through said ports into the annular space surrounding the casing. By the term "serially ejected", it is meant that several batches of cementitious material, separated by batches of drilling fluid, are either simultaneously forced through a series of valve openings placed at different levels in the casing, or that such cementitious material may be serially ejected through said ports with sufficient time elapsing for each batch of cementitious material to set before the placing of the next batch in the series.

A still further object of this invention is to disclose and provide a method of cementing long strings of casing in a well hole in which predetermined volumes of cementitious material and hydraulic fluid are alternately introduced into a casing and the cementitious material serially ejected from the casing into the annular space surrounding the same while retaining the hydraulic fluid within the casing.

Another object of this invention is to disclose and provide a method of cementing long strings of casing in deep well holes whereby the annular space behind the entire string of casing, or any part thereof, may be cemented within a relatively short period of time.

Still another object of this invention is to disclose and provide means whereby a long string of casing may be cemented in a deep well hole by progressively opening ports in the walls of the casing in spaced relation along its length, whereby cementitious material may be serially ejected from said casing through said ports.

In addition, it is an object of this invention to disclose and provide a novel cementing valve for use in cementing casings and the like.

These and other objects, uses and advantages of the invention will become apparent to those skilled in the art from a contemplation of the invention as described hereinafter.

In describing the invention, reference will be had to the appended drawings, in which:

Figs. 1 to 7 inclusive diagrammatically represent a sequence of steps employed in carrying out a simple embodiment of this invention.

Fig. 8 diagrammatically represents a section through a well hole in which a cementing method in accordance with this invention is being performed.

Briefly stated, the method of the invention may be said to consist of the steps of alternately introducing predetermined volumes of a cementitous material and a hydraulic fluid into a casing, ejecting the lowermost volume of cementitious material from the casing into a well hole while retaining the hydraulic fluid immediately thereabove, and then ejecting the cementitious material next above said ejected volume into the well hole at a point above said retained volume of hydraulic fluid. In other words, the cementing of a long string may thus be accomplished as a step operation, the cementitious material being serially ejected into the annular space surrounding the casing at a plurality of vertically spaced points, such ejection occurring progressively. It is to be noted that hydraulic fluid is retained in the casing so that at the conclusion of the cementing operation, very little cementitious material remains in the casing, thereby permitting the casing to be readily cleaned.

The mode of operation of this invention may be best explained by reference to the appended drawings and particularly to Figs. 1 to 7 thereof. These figures diagrammatically represent a well hole, the numeral 1 indicating the outer walls of said well hole. Within said well hole is a long string of casing indicated at 2. The casing is preferably provided with a cementing valve 3 at a suitable point along its length. For example, the well hole 1 may be 6,000 feet long and it may be assumed that the cementing sleeve or valve 3 is positioned at about the 3,000 foot level.

Figures 1, 2, 3, 4, 5, 6, 7, 8:
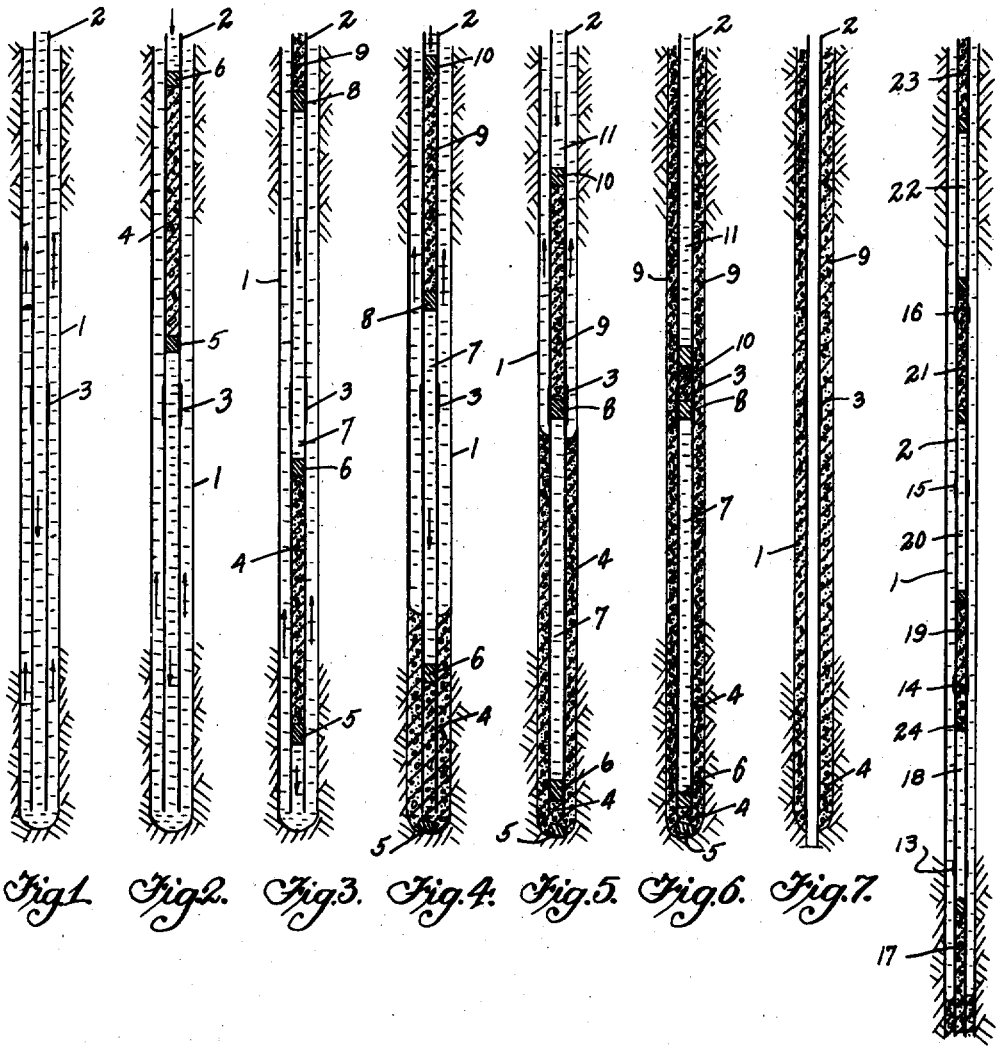

The method of this invention is carried out as follows:

Mud fluid is circulated downwardly through the casing 2 and upwardly through the annular space surrounding the casing, as indicated by the arrows in Fig. 1. Such circulation is carried out until the interior of the well hole 1 is cleared of all débris, bridges, cavings, or other restrictions. A predetermined volume of cementitious material is then mixed and introduced into the top of the casing 2, as indicated in Fig. 2. This predetermined quantity of cementitious material or slurry is indicated at 4. It may be preceded by a bottom plug 5 also introduced into the casing. The volume of cementitious material or slurry 4 is ordinarily sufficient to fill the annular spacer surrounding the lower portion of the casing 2, that is to say, when the cementitious material 4 is eventually discharged from the bottom of the casing 2, it will rise within the annular space surrounding the lower portion of the casing 2 and fill such space from the bottom of the casing up to about the level of a cementing valve 3.

A top plug 6 is introduced into the top of the casing above this predetermined volume of cementitious material 4. This top plug 6, as well as the bottom plug 5, is so designed as to pass through a cementing valve or sleeve 3 without actuating such valve. A hydraulic fluid such as water, or a mud fluid, is then introduced into the casing 2 on top of the top plug 6 and in this manner the charge of cement 4, together with the bottom plug 5 and the top plug 6, is forced downwardly through the casing 2.

As shown in Fig. 3, after the predetermined charge of hydraulic fluid 7 is introduced into the casing 2, another bottom plug 8 is introduced into the top of the casing above such predetermined volume of hydraulic fluid 7. A second predetermined volume of cementitious material is then forced into the casing 2 on top of the bottom plug 8, this second charge of cementitious material being indicated at 9. Such second charge of cementitious material 9 is then capped or followed by a top plug 10 introduced into the casing 2 immediately above the charge of cementitious material 9.

The volume of hydraulic fluid 7 introduced into the casing 2 on top of the first charge of cementitious material 4 separates said charge of cementitious material from the secondary charge 9. In actual practice, the volume of said hydraulic fluid 7 is preferably slightly less than the volumetric capacity of the casing 2 below the cementing valve or sleeve 3.

As shown in Fig. 5, the top plug 10 which was introduced into the casing immediately above the secondary charge of cement 9, is followed by a hydraulic fluid 11 which is forced into the casing 2. By referring back Figs. 2, 3 and 4, it will be noted that the first charge of cementitious material 4 has been forced downwardly through the casing until, as shown in Fig. 4, said charge of cementitious material is ejected from the lower end of the casing 2 into the annular space surrounding said casing wherein it moves upwardly through said annular space. Such ejection of cementitious material is continued until, as shown in Fig. 5, the bottom plug 8 reaches the cementing sleeve or valve 3 and becomes seated therein, thus forming a barrier in the casing 2. By this time, the first charge of cementitious material, indicated by the numeral 4, has filled the annular space surrounding the lower portion of the casing 2 up to a point at or slightly above the cementing valve 3, such cementitious material having been displaced by the non-setting mud fluid separating the two charges.

The bottom plug 8 not only becomes caught in the cementing sleeve 3, thus forming a barrier in the casing 2, but in addition said bottom plug opens ports in the cementing sleeve or valve 3, permitting the secondary charge of cementitious material 9 to be ejected through said ports into the annular space surrounding the casing 2. The cementitious material 9 is ejected through the ports of the cementing sleeve 3 by reason of the pressure being exerted thereupon by the hydraulic fluid 11 being forced into the top of the casing 2.

In this manner, the cementitious material 9 is ejected into the annular space surrounding the upper portion of the casing 2 and rises in such annular space, encircling and cementing the upper portion of the casing 2 up to any desired level within the well hole, as indicated in Fig. 6. The introduction of the hydraulic fluid 11 into the casing 2 is terminated when the upper or top plug 10 approaches or reaches the level of the cementing sleeve 3. It is desirable, however, to discontinue the injection of hydraulic fluid 11 while a quantity of cementitious material 9 still remains in the casing 2 between the bottom plug 8 and the top plug 10.

The cement thus introduced into the annular space surrounding the casing 2 is permitted to set and after setting, the interior of the casing 2 is cleared as by means of drilling tools or tubing lowered through the casing, resulting in a completely cemented string of casing, as shown in Fig. 7.

It is to be noted that the cementitious material encircling and encasing the upper portion of the casing 2 has not been forced to travel the entire length of the casing nor subjected to the time necessary to travel such a distance and upward again. Also, as it was not ejected from the bottom end of a casing, it has not been subjected to the high temperatures existing in the bottom of the well. For these reasons, the pressures employed in forcing the cementitious material into position around the casing, have been relatively low.

For example, the static head of 6,000 feet of cement slurry weighing 113 pounds per cubic foot, would be about 4700 pounds per square inch at a depth of 6,000 feet. If it had been necessary to pump the cement slurry down through the center of the casing and then upwardly around the casing from the 6,000 foot depth to the surface, then pressures in excess of 2,000 pounds per square inch would have been required in the illustrative example given hereinabove. Furthermore, although a 6,000 foot head of cement slurry exerts a pressure of about 4700 pounds per square inch, the pressure actually required to raise the cement to this height, will be much greater due to the resistance to flow of slurry caused by restrictions in the annular space surrounding the casing, relatively large surface contact and friction. In the use of cement slurry, there is also a decrease in fluidity and plasticity caused by hydration and partial setting of the slurry. This partial hydration or setting is particularly evident in deep wells and is partially caused by the longer time necessary to place the slurry and the high temperatures (150° F.–250° F.) encountered in such wells. These high temperatures cause the cement slurry to stiffen or agglomerate so that not only is a much higher pressure required to force the cement slurry up through the annular space surrounding the casing, but in addition the slurry loses its ability to set and form a coherent, strong body around the casing.

The method described hereinabove, however, permits the cement slurry to be placed in position within a very relatively short time after it is mixed. In actual practice, it has been found that a cement slurry must be placed in final position within 40 minutes of the time that such batch of slurry was started to be mixed. Naturally, it would be almost impossible to force a batch of slurry downwardly through the center of a casing for a distance of 6,000 feet or more and then upwardly for a similar distance, within 40 minutes from the time it was started to be mixed. Under the method of operation described hereinabove, however, the various stages at which the cementing valves or sleeves 3 are set may be so chosen as to positively insure the placing of the cement slurry within the required time interval.

In the example illustrated in Figs. 1 to 7, a two-stage method has been described employing but a single intermediate cementing sleeve or valve 3. It is to be understood that the method contemplates the utilization of a plurality of steps and valves when such procedure is deemed advisable as, for example, in wells of 6,000 feet or greater depth. For example, as shown in Fig. 8, the casing 2 may be provided with cementing sleeves or valves 13, 14, 15 and 16, at various levels. In cementing a deep well of this nature, a plurality of charges of cementitious material are introduced into the casing, each of said charges being separated by a predetermined volume of hydraulic fluid. In Fig. 8, the casing 2 is shown to contain a lower charge of cementitious material 17, said charge of cement being forced downwardly by a body 18 of hydraulic fluid, a superimposed body 19 of cementitious material, another body of hydraulic fluid 20, a still further charge of cementitious material 21, another body 22 of hydraulic fluid, and a top charge 23 of cementitious material. The various bodies of cementitious material are or may be provided with top and bottom plugs. The lowermost charge 17 may be ejected from the lower end of the casing 2. The charge next above and indicated by the numeral 19, will eventually be discharged from the casing by the cementing valve 13. The volume of cement, indicated by the numeral 21, will eventually be discharged by the cementing valve 14, etc.

It is to be understood that the various bottom plugs, such as for example, the bottom plug 24 (Fig. 8) separating the hydraulic fluid 18 from the secondary charge of cementitious material 19, are so constructeed as to operate but a specific cementing sleeve or valve. For example, the bottom plug 24 should not stop or operate the sleeves or valve members 14, 15 and 16 but instead should pass therethrough. The bottom plug 24, however, should cooperate with the cementing sleeve or valve member 13.

Figure 9:
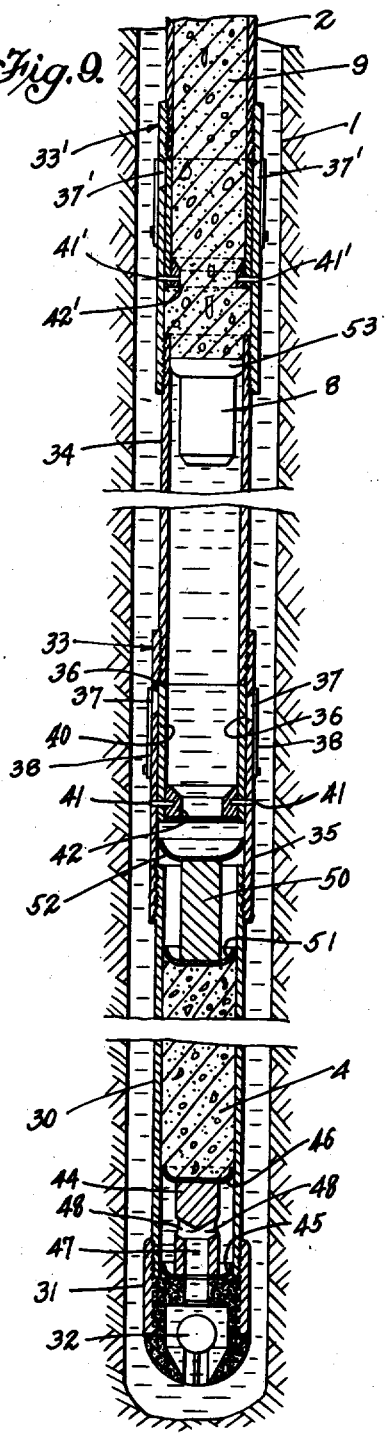
Fig. 9 is an enlarged longitudinal section through a casing provided with one form of cementing valve adapted to be used in carrying out the method of this invention.

Fig. 9 discloses one embodiment of means adapted to carry out the method described hereinabove. As shown in this figure, the bottom portion of the casing identified by the numeral 30, may be provided at its lower end with a guide shoe 31 provided with a back pressure valve 32. Such lower portion 30 of the casing may carry a suitable cementing sleeve or valve 33, said cementing sleeve or valve being positioned a suitable distance above the lower end of the casing 30. Other casing sections 34 are connected to the upper end of the cementing valve or sleeve 33 and a secondary cementing valve 33' may be positioned a suitable distance above the lower cementing valve 33.

The cementing sleeve or valve 33 may consist of an outer tubular member 35 made of coupling stock and may be provided with a plurality of valved ports 36. These ports may be closed exteriorly by means of valve members 37 provided with spring actuated means for maintaining the valve members 37 seated in the ports 36, whereby cementitious material may be forced through the ports 36 out of the casing into the well hole and the passage of fluid or cement from the well hole into the casing may be prevented. Springs 38 may be provided for this purpose. Slidably mounted within the tubular body portion 35 may be a sleeve 40, the internal diameter of said sleeve being substantially identical with the internal diameter of the casing sections 30 and 34. Suitable means may be provided for maintaining the sleeve 40 in position within the body portion 35 so as to close the ports 36. Such means may comprise shear pins 41 carried by the body portion 35 and connecting the sleeve 40 with the body portion. The sleeve 40 may also be provided with an inwardly extending member or restriction 42.

The cementing sleeve or valve 33' may be identical with the cementing device 33 although the restriction or inwardly extending member 42' of the cementing device 33' does not extend inwardly as great a distance as the member 42 of the lower cementing device 33. Cementing devices of the character described in my co-pending application may be employed instead of the device illustrated on the appended drawings.

In carrying out the method of this application in the apparatus described hereinabove, a bottom plug 44 may be introduced into the top of the casing and a predetermined volume of cementitious material introduced into the casing on top of the bottom plug 44, the bottom plug 44 being preferably provided with a body portion of sufficiently small diameter to permit its passage through any of the restrictions in the cementing devices 33 and 33' positioned in the casing. Furthermore, the bottom plug 44 may be provided with two cups of flexible material such as leather, for example a lower flexible cup 45 and an upper flexible cup 46. The body portion of the plug 44 may also be provided with an axial bore 47 and branches 48.

The predetermined charge of cementitious material is introduced into the casing above the bottom plug 44 and a top plug 50 may be introduced into the casing on top of the charge of cementitious material, such charge being referred to by the numeral 4. A predetermined volume of hydraulic fluid such as mud fluid, is then introduced into the casing above the top plug 50, thus causing the charge of cementitious material 4 to be forced downwardly through the center of the casing. The upper plug 50 may be provided with a body portion of sufficiently small diameter to pass through all of the cementing devices 33, 33', etc., positioned in the casing. It may also be provided with two flexible cup members 51 and 52 adapted to substantially seal off the hydraulic fluid from the charge of cementitious material 4. After a suitable volume of hydraulic fluid is thus introduced on top of the top plug 50, the bottom plug 8 is introduced into the top of the casing. This plug may be provided with a body portion adapted to pass through those cementing devices such as the cementing device 33' but adapted to be stopped and retained by the restriction 42 of the cementing device 33. Such bottom plug may be provided with an upper cup member 53.

A suitable charge of cementitious material 9 may be introduced into the top of the casing above the bottom plug 8. A top plug 10 may then be introduced into the top of the casing on top of the charge of cementitious material 9 and this may be followed by another charge of hydraulic fluid. The top plug 10 is preferably of such diameter as to pass through the restriction 42' of the cementing device 33'.

Figure 10:
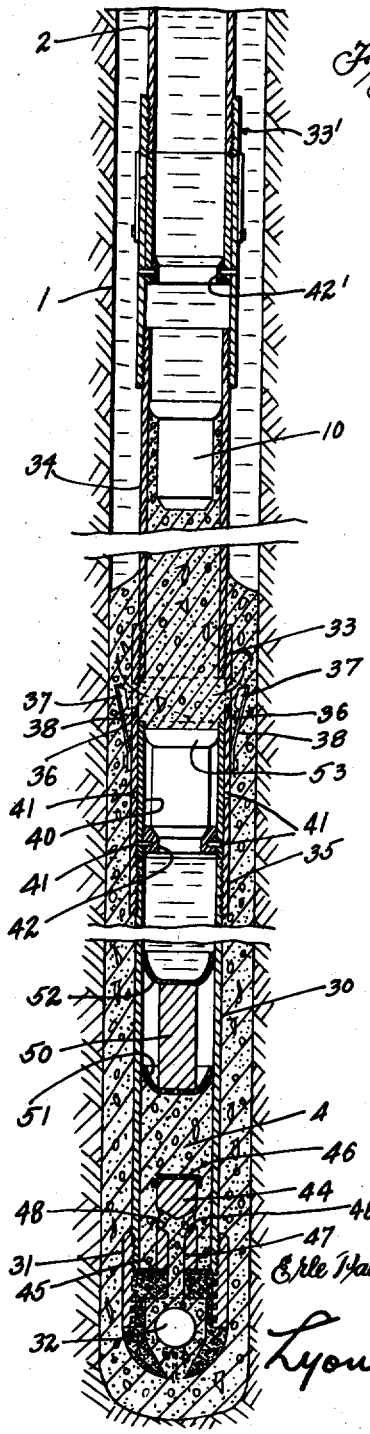
Fig. 10 is an enlarged longitudinal section through a casing and valve of the character shown in Fig. 9, the valve being in operated position.

The mode of operation described hereinbefore with reference to Figs. 1 to 7, is therefore taking place in the casing illustrated in Figs. 9 and 10. The bottom plug 44 eventually comes to rest on the back pressure valve 32 carried by the guide shoe 31, the central bore 47 of said bottom plug 44 coming into alignment with the outlet of the back pressure valve 32. The pressure of the cementitious material 4 immediately above the bottom plug 44 causes the upper cup member 46 to be deflected downwardly, additional pressure forcing the cementitious slurry 4 to be ejected through the plug 44 and through the back pressure valve 32 into the annular space surrounding the bottom section 30 of the casing. This cementitious slurry is caused to rise upwardly in said annular space. The top plug 50 is being constantly forced downwardly by the pressure applied to the slurry and hydraulic fluid within the casing and the downward movement of the top plug 50 continues until the bottom plug 8 comes to rest on the restriction 42 of the cementing device 33. By the time the bottom plug 8 comes to rest on the restriction 42 of the sleeve 40, the cementitious material 4 has been forced upwardly through the annular space surrounding the lower section 30 of the casing to a point contiguous to the cementing device 33 or immediately above said cementing device 33.

The application of further pressure to the hydraulic fluid being introduced into the top of the casing causes the cementitious slurry 9 to force the bottom plug 8 downwardly, this downward pressure causing the plug 8 to strike the restriction 42 and the sleeve 40 to move downwardly within the tubular member 35 so as to expose the ports 36. The cementitious slurry 9 is then ejected through the ports 36, the spring actuated valves 37 opening outwardly. The cementitious slurry 9 may pass through the still moving upper portion of the cement 4, thus insuring the formation of a substantially monolithic cementitious coating on the exterior of the casing sections 30 and 34.

The charge 9 of cementitious material is of such volume as to completely fill the annular space surrounding the casing section 34 from the level of the cementing device 33 to the level of the upper cementing device 33′ or just above same. An action similar to that just described then takes place in the cementing device 33′, a tertiary bottom plug coming to rest upon the restriction 42′ and eventually opening the cementing device 33′ so as to permit the ejection of another batch of cementitious material through said cementing device.

It is to be noted that it is not absolutely necessary to use the top plugs (between batches of cementitious material and superimposed hydraulic fluid) and in some instances, it is desirable to leave out the top plugs for mechanical reasons.

Furthermore, it is to be noted that after the cement has set in the well hole (between the casing and walls of the hole) only relatively small quantities of cement remain in the casing and therefore, the drilling out operations are readily carried out.

Figure 11:
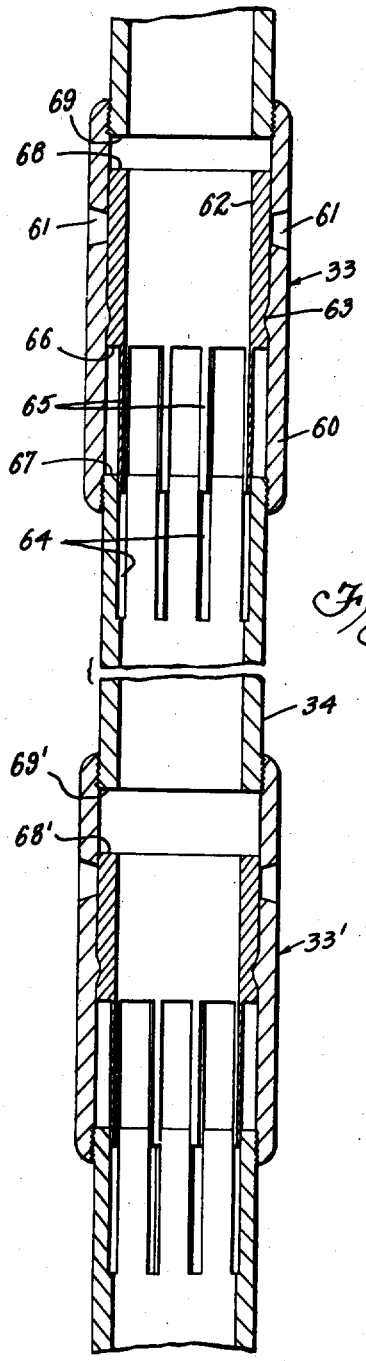
Fig. 11 is an enlarged longitudinal section of a casing provided with a modified form of valve adapted to be used in carrying out the method of this invention.

A modified form of cementing means which does not employ restrictions of varying degree in the casing, is shown in Fig. 11. Two cementing valves 33 and 33′ are shown in the casing 34. The cementing valve 33 comprises an outer tubular member 60 provided with a plurality of ports 61. Within the tubular member 60 and between the shoulders formed by the ends of casing sections connected together by the member 60, is a sleeve 62. The sleeve 62 is releasably held within the tubular member 60 in any desired manner so as to normally cover the ports 61. The releasable holding means may include a bead and groove construction, i. e., an inwardly extending bead 63 carried by the member 60 and a corresponding groove in the sleeve 62.

The end portion of the casing 34 immediately below the cementing valve 33 may be provided with a plurality of longitudinally extending grooves 64 adapted to slidably receive guiding fingers 65 carried by the sleeve 62. The fingers 65 are of less thickness than the sleeve 62, thereby leaving a shoulder 66 adapted to form a stop able to come into abutting relation with the upper edge 67 of the casing when the sleeve 62 is moved downwardly within the member 60.

It is to be noted that when the sleeve 62 is retained within the tubular member 60 so as to cover the port 61, a certain predetermined space exists between the top 68 of the sleeve and the edge 69 of the casing. This space is adapted to readily receive expanding members or lugs carried by a plug whereby the plug introduced into the upper end of the casing and forced downwardly through the casing, may engage with the shoulder 68 and cause the sleeve 62 to move downwardly in the member 60.

Figure 12:
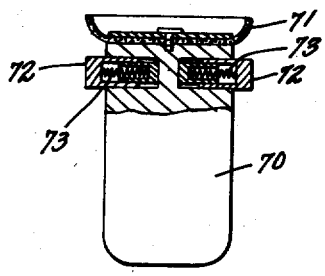
Figs. 12 and 13 are a side elevation, partly in section and a transverse section of one type of plug adapted for use with the valve assembly shown in Fig. 11.
Figure 13:
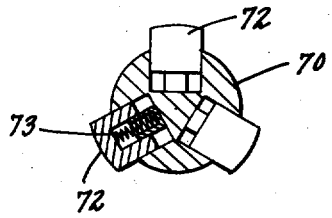

A suitable plug is illustrated in Figs. 12 and 13. As there shown, the plug may consist of a body portion 70 provided at its upper end with a flexible cup 71. The upper part of the plug may contain two or more expandible members such as the lugs 72 slidably carried by the body portion. Springs 73 may normally force the lugs 72 radially upwards. The lugs of a plug of this character will expand and enter the space between the upper edge 68 of the sleeve 62 and the edge 69 of the casing when the plug reaches the cementing valve, thereby permitting further application of pressure to the top of the plug to release the holding means such as the bead 63 and cause the sleeve 62 to move downwardly uncovering the ports 61.

When a plurality of cementing valves are used in the same string of casing, the valves are so arranged that the spaces as between 68 and 69 are smaller in the top cementing valves and progressively larger in the lower valves. For example, as shown in Fig. 11, the space between 68′ and 69′ is appreciably greater than the space between 68 and 69. By varying the width of the lugs 72 carried by the plugs, the plugs may be caused to selectively actuate the cementing sleeves. For example, a plug may be introduced into the casing of said plug having lugs 72 of such width that they would not enter the space between 68 and 69 of valve 33 but would enter the space between 68′ and 69′ of valve 33′. In this manner, the lower valve 33′ may be actuated before the upper valve 33 is actuated by a separate plug capable of cooperating with the particular space there used.

It is to be noted that the fingers 65 carried by the sleeves 62 perform a number of separate functions, such fingers preventing lug 72 of plugs destined for lower valves from catching upon the shoulders 67. Furthermore, the fingers 65 prevent the sleeves 62 from rotating within the tubular members 60.

It is to be understood that although a particular method has been described in detail, numerous changes and modifications could be made therein without departing from the invention. For example, it is not necessary to employ the cementing valves nor to cement the entire string of casing at one time. That is, the cementitious material or slurry need not be serially ejected at substantially the same time. A batch of cementing material may be placed around a lower portion of the casing by operating any desired cementing valve and after such cement has set, any desired upper portion of the same casing may be subsequently cemented by operating an upper cementing valve.

These and other modifications and changes coming within the scope of the appended claims are embraced thereby.

I claim:

1. In a method of cementing long strings of casing in a well hole, the steps of: alternately introducing predetermined volumes of a cementitious material and hydraulic fluid into a casing; ejecting the lowermost volume of cementitious material from said casing into a well hole while retaining the hydraulic fluid immediately thereabove, and then ejecting the cementitious material next above said ejected volume into the well hole at a point above said retained volume of hydraulic fluid.

2. In a method of cementing long strings of casing in a well hole, the steps of: alternately introducing predetermined volumes of a cementitious material and hydraulic fluid into a casing; ejecting the lowermost volume of cementitious material from said casing into a well hole while retaining the hydraulic fluid immediately thereabove, then ejecting the cementitious material next above said ejected volume into the well hole at a point above said retained volume of hydraulic fluid, permitting said ejected cementitious material to set in the well hole around said casing, and finally clearing the center of said casing.

3. In a method of cementing long strings of casing in a well hole, the steps of: alternately introducing predetermined volumes of a cementitious material and hydraulic fluid into a casing; ejecting the lowermost volume of cementitious material from said casing into a well hole while retaining the hydraulic fluid immediately thereabove in the casing, forming a barrier in the casing above said retained hydraulic fluid, then ejecting the cementitious material next above said ejected volume from the casing into the well hole at a point above said barrier, and permitting said ejected cementitious material to set in the well hole around said casing.

4. In a method of cementing long strings of casing in a well hole, the steps of: alternately introducing predetermined volumes of a cementitious material and hydraulic fluid into a casing, ejecting the lowermost volume of cementitious material from said casing into a well hole while retaining the hydraulic fluid immediately thereabove in the casing, forming a barrier in the casing above said retained hydraulic fluid, opening ports in said casing above said barrier, then ejecting the cementitious material next above said ejected volume from the casing and through said ports into the well hole at a point above said barrier while retaining in the casing the hydraulic fluid immediately above said cementitious material, and permitting said ejected cementitious material to set in the well hole around said casing.

5. In a method of cementing long strings of casing in a well hole, the steps of: alternately introducing predetermined volumes of cementitious material and hydraulic fluid into a casing; serially opening ports along said casing, and ejecting the cementitious material serially through said ports into the well hole while retaining the hydraulic fluid within said casing.

6. In a method of cementing long strings of casing in a well hole, the steps of: alternately introducing predetermined volumes of cementitious material and hydraulic fluid into a casing; serially opening ports along said casing, ejecting the cementitious material serially through said ports into the well hole while retaining the hydraulic fluid within said casing, permitting said ejected cementitious material to set in the well hole around said casing, and finally clearing the center of said casing.

7. In a method of cementing a long string of casing in a well hole, the steps of: circulating a fluid downwardly through the center of the casing and upwardly through the well hole and exteriorly of the casing to remove debris; introducing a predetermined volume of cementitious material into the top of the casing; introducing a top plug into the casing on top of said cementitious material; introducing a predetermined volume of fluid on top of said top plug; introducing a bottom plug into said casing on top of said volume of fluid; then introducing a second volume of cementitious material into the top of the casing above said bottom plug; inserting a top plug into the casing on top of said volume of cementitious material; introducing a hydraulic fluid into the top of said casing above said last named top plug while forcing said first named volume of cementitious material from said casing into said well hole and upwardly around the lower portion of the casing; forming a barrier in said casing at a point near the top of the section of casing cemented by said first named volume of cementitious material; opening passageways in the walls of said casing above said barrier, forcing said second volume of cementitious materials out of said casing through said passageways and upwardly around the upper portion of said casing; and permitting said cementitious material to set around said casing.

8. An apparatus of the character described comprising a string of casing provided with a plurality of cementing sections carried in longitudinally spaced relation by said string of casing, each of said cementing sections including an outer ported member and an inner sleeve valve, said sleeve valves being selectively operable to open said ports.

9. An apparatus of the character described comprising a string of casing provided with a plurality of cementing sections carried in longitudinally spaced relation by said string of casing, each of said cementing sections including an outer ported member and an inner sleeve valve, said sleeve valves being selectively operable to open said ports, and a plurality of plugs adapted to selectively cooperate with said cementing sections to selectively actuate said sleeve valves to open ports controlled thereby.

10. An apparatus of the character described comprising a string of casing provided with a plurality of cementing valves carried in longitudinally spaced relation by said string of casing, each of said cementing valves including port means adapted to place the interior of the casing in communication with the exterior, and a plurality of plugs adapted to be received within the casing and to selectively cooperate with said cementing valves to selectively open said ports.

11. An apparatus of the character described comprising an outer tubular member adapted to connect aligned casing sections in spaced relation, ports in said tubular member, an inner sleeve valve in said tubular member, means for releasably holding said sleeve in position in said tubular member over said ports and in spaced relation to the ends of said tubular member, and finger means carried by said sleeve and adapted to cooperate with a casing connected to said tubular member.

12. An apparatus of the character described comprising an outer tubular member adapted to connect aligned casing sections in spaced relation, ports in said tubular member, an inner sleeve valve in said tubular member, means for releasably holding said sleeve in position in said tubular member over said ports and in spaced relation to the ends of said tubular members, and long extending fingers carried by said sleeve and adapted to cooperate with long grooves formed in a casing connected to said tubular member.

13. An apparatus of the character described consisting of a string of imperforate casing provided with a plurality of cementing valves carried by said string of casing in spaced relation, said cementing valves being selectively operable to open ports in said casing whereby fluid under pressure may be passed directly through the imperforate casing to a selected valve.

14. An apparatus of the character described, comprising a string of casing, three or more cementing valves carried in longitudinally spaced relation by said casing, said cementing valves being selectively operable to open ports in said casing to place the interior of said casing in communication with the exterior.

15. An apparatus of the character described, comprising a string of imperforate casing, a plurality of cementing sections carried in longitudinally spaced relation by said string of imperforate casing, said cementing sections being provided with valves adapted to permit the passage of fluid under pressure from the interior of the casing to the exterior and to prevent the passage of fluid from the exterior into the casing.

16. An apparatus of the character described, comprising a string of imperforate casing, a plurality of cementing sections carried in longitudinally spaced relation by said string of imperforate casing, said cementing sections being provided with valves adapted to permit the passage of fluid under pressure from the interior of the casing to the exterior and to prevent the passage of fluid from the exterior into the casing, said valves being selectively operable.

17. An apparatus of the character described, consisting of a string of imperforate casing provided with a plurality of cementing valves carried in longitudinally spaced relation by said casing, said cementing valves being selectively operable in upward series to open ports in said casing whereby fluid under pressure may be passed directly through the imperforate casing to a selected valve.

18. An apparatus of the character described, comprising a string of casing, a plurality of cementing sections carried in longitudinally spaced relation by said string of casing, said cementing sections being provided with valves adapted to permit the passage of fluid under pressure from the interior of the casing to the exterior and to prevent the passage of fluid from the exterior into the casing, and a plurality of plugs adapted to be received within the casing and to selectively cooperate with said cementing valves to selectively open them.

19. An apparatus of the character described, comprising a string of casing provided with a plurality of cementing sections carried in longitudinally spaced relation by said string of casing, each of said cementing sections including an outer ported member and an inner sleeve valve, and means for preventing said sleeves from rotating, said sleeve valves being selectively operable to open said ports.

20. An apparatus of the character described, comprising a string of casing provided with a plurality of cementing sections carried in longitudinally spaced relation by said string of casing, each of said cementing sections including an outer ported member and an inner sleeve valve, said sleeve valves being selectively operable to open said ports, means for preventing said sleeves from rotating, and a plurality of plugs adapted to selectively cooperate with said cementing sections to selectively actuate said sleeve valves to open ports controlled thereby.

21. A method of cementing casing which comprises: positioning a string of casing in a well hole; introducing cementitious material into the string of casing; forcing the cementitious material downwardly directly through said casing; and discharging separate portions of said cementitious material into the well hole around said casing at different levels and at substantially the same operation.

22. The method of cementing a string of casing in a well hole which includes: passing separate batches of cementitious material simultaneously downwardly through the casing, and discharging the separate batches separately into the well hole around the casing into direct contact with the walls of the well hole at different levels and at substantially a continuous operation.

23. A method of cementing casing in well holes, including the steps of depositing separated charges of cementitious material in the casing to be cemented, forcing the charges directly through the casing, causing the first of the charges to be extruded from the casing into direct contact with the walls of the well hole at one elevation, and causing the next charge to be extruded at a higher elevation.

24. A method of cementing casing in wells, including the steps of depositing separated charges of cementitious material in the casing to be cemented, forcing the charges downwardly directly through the casing, causing the first of the charges to be extruded from the casing at one elevation, and causing the next charge to be extruded at a higher elevation.

25. A method of cementing casing in well holes, including the steps of depositing separate charges of cementitious material separated by bodies of fluid in the casing to be cemented, forcing the separated charges downwardly through the casing, causing substantially all of the first of the charges to be extruded from the casing at one elevation, and causing substantially all of the next charge of cementitious material to be extruded at a higher elevation.

26. A method of cementing a string of casing in a well hole, including depositing a plurality of superposed separated charges of cementing material in the casing, simultaneously forcing the charges downwardly through the casing, forcing the lowermost charge of cementing material directly through the casing to the lowermost area to be cemented, discharging the same into the well hole, cutting off the flow of the next superposed charge at a higher elevation, and distributing such superposed charge at such higher elevation.

27. A method of cementing a string of casing in a well hole, including depositing a plurality of superposed separated charges of cementing material in the casing, simultaneously forcing the charges downwardly through the casing, forcing the lowermost charge of cementing material to the lowermost elevation to be cemented, discharging such charge into the well hole at such elevation, cutting off the flow of the next superposed charge at a higher elevation, discharging such superposed charge of cementing material at such higher elevation, and cutting off the back flow of said superposed charge.

28. A method of cementing a string of casing in a well hole, comprising introducing a plurality of charges of cementing material separated by charges of non-cementing fluid into the casing, forcing such charges simultaneously and downwardly directly through said casing, forcing the lowermost charge of cementing material directly through said casing to the lowermost area to be cemented, discharging substantially all of said charge into the well hole, cutting off the downward passage of the next superposed charge of cementing material at a higher elevation, and discharging substantially all of said superposed charge into the well hole at such higher elevation.

29. An apparatus for cementing casing in well holes, including a string of casing to be cemented, said string being provided with ports adapted to discharge cement at different elevations, means normally blocking said ports, and additional means operable by the pressure on the cement being positioned to move said blocking means to open said ports.

30. A method of cementing a string of casing in a well hole, comprising simultaneously forcing separated bodies of cementitious material directly through a string of casing and discharging said bodies of cementitious material at longitudinally spaced points along said casing into the well hole, said longitudinally spaced points being spaced a distance slightly in excess of the distance separating said bodies of cementitious material.

31. A method of cementing a string of casing in a well hole, comprising forcing bodies of cementitious material separated by a body of non-setting fluid downwardly through a casing, discharging substantially all of the lowermost of said cementitious bodies from the casing into the well hole at a low elevation by displacing such body from within the casing with said separating body of non-setting fluid, and then discharging the next body of cementitious material from the casing into the well hole at a point above the body of non-setting fluid in the casing.

32. A method of cementing pipe in wells including the operation of depositing separated charges of cement in the pipe to be cemented, forcing the charges through the pipe, causing the first of the charges to be extruded from the pipe at one elevation, and causing the next charge to be extruded at a higher elevation in the pipe.

ERLE PALMER HALLIBURTON.